United States Patent
Spitzer

(10) Patent No.: US 7,788,448 B2
(45) Date of Patent: Aug. 31, 2010

(54) SEQUENCER CACHE AND METHOD FOR OPERATING THE SAME

(75) Inventor: Marc Spitzer, San Jose, CA (US)

(73) Assignee: PMC-Sierra US, Inc., Santa Clara, CA (US)

(*) Notice: Subject to any disclaimer, the term of this patent is extended or adjusted under 35 U.S.C. 154(b) by 411 days.

(21) Appl. No.: 11/624,938

(22) Filed: Jan. 19, 2007

(65) Prior Publication Data

US 2007/0162705 A1 Jul. 12, 2007

Related U.S. Application Data

(63) Continuation-in-part of application No. 11/234,623, filed on Sep. 22, 2005, which is a continuation-in-part of application No. 11/075,830, filed on Mar. 8, 2005, now abandoned.

(60) Provisional application No. 60/551,531, filed on Mar. 8, 2004.

(51) Int. Cl.
*G06F 12/00* (2006.01)
(52) U.S. Cl. .................................................. 711/118
(58) Field of Classification Search ................. None
See application file for complete search history.

(56) References Cited

U.S. PATENT DOCUMENTS

| | | | | |
|---|---|---|---|---|
| 6,789,172 | B2* | 9/2004 | Chauvel et al. | 711/144 |
| 7,000,048 | B2* | 2/2006 | McAlpine et al. | 710/200 |
| 7,162,584 | B2* | 1/2007 | Adl-Tabatabai et al. | 711/118 |
| 7,493,448 | B2* | 2/2009 | Yamazaki | 711/128 |
| 2005/0154826 | A1* | 7/2005 | Marks et al. | 711/114 |
| 2006/0282558 | A1* | 12/2006 | Chen et al. | 710/22 |

* cited by examiner

*Primary Examiner*—Tuan V Thai
*Assistant Examiner*—Duc T Doan
(74) *Attorney, Agent, or Firm*—Martine Penilla & Gencarella, LLP

(57) ABSTRACT

A cache system includes a cache memory dedicated to service a number of sequencers with sequencer code. A number of cache managers are defined to direct placement of sequencer code portions into the cache memory. Also, each of the number of cache managers is defined to provide sequencer code from the cache memory to a respectively assigned sequencer. An external memory is defined to store a complete version of the sequencer code. A direct memory access (DMA) engine is defined to write sequencer code portions from the external memory to the cache memory, in accordance with direction from the number of cache managers.

17 Claims, 4 Drawing Sheets

SEQUENCER CACHE AND METHOD FOR OPERATING THE SAME

CLAIM OF PRIORITY

This application is a continuation-in-part of prior U.S. application Ser. No. 11/234,623, filed Sep. 22, 2005, which is a continuation-in-part of prior U.S. application Ser. No. 11/075,830, filed Mar. 8, 2005, now abandoned which claims the benefit of U.S. Provisional Application No. 60/551,531, filed on Mar. 8, 2004. The disclosures of U.S. application Ser. No. 11/234,623, U.S. application Ser. No. 11/075,830, and U.S. Provisional Application No. 60/551,531 are incorporated herein by reference.

BACKGROUND

In a Serial Attached SCSI (SAS) communication architecture, a SAS interface engine is provided. The SAS interface engine includes a number of SAS controllers connected to control a peripheral device, e.g., disk drive. Each of the SAS controllers is defined to include a respective sequencer. Each sequencer is defined as a processor chip having a limited memory defined thereon. The sequencers are defined to operate in accordance with sequencer code, i.e., sequencer program instructions. Each sequencer is tasked with controlling delivery of data to or from the device to which it is connected. Additionally, the sequencers can be defined to control other tasks, such as exception handling and status reporting.

As the functionality of the sequencer is expanded, the amount of required sequencer code expands accordingly. The sequencer code can quickly expand beyond the capacity of the limited memory defined onboard the sequencer. Because the sequencer and its associated memory is restricted to a limited amount of chip area, expansion of the functionality of the sequencer causes chip area to become a limiting factor. For example, due to chip area constraints, it may not be feasible to increase the size of the memory onboard the sequencer to accommodate the desired expansion of sequencer functionality.

SUMMARY

In one embodiment, a cache system is disclosed. The cache system includes a cache memory dedicated to service a number of sequencers with sequencer code. A number of cache managers are defined to direct placement of sequencer code portions into the cache memory. Also, each of the number of cache managers is defined to provide sequencer code from the cache memory to a respectively assigned sequencer. The cache system also includes an external memory defined to store a complete version of the sequencer code. A direct memory access (DMA) engine is defined to write sequencer code portions from the external memory to the cache memory, in accordance with direction from the number of cache managers.

In another embodiment, a communication architecture is disclosed. The communication architecture includes a sequencer processor having a memory defined onboard the sequencer processor. The communication architecture further includes a sequencer cache system defined separate from the sequencer processor. The sequencer cache system is defined to supply sequencer code not present in the memory defined onboard the sequencer processor.

In another embodiment, a method is disclosed for operating a sequencer cache. The method includes an operation for receiving a request for sequencer code. A determination is made as to whether or not the requested sequencer code is present in the sequencer cache. If the requested sequencer code is present in the sequencer cache, the requested sequencer code is provided from the sequencer cache. If the requested sequencer code is not present in the sequencer cache, a direct memory access (DMA) is performed to write the requested sequencer code into the sequencer cache from an external memory. Then, the requested sequencer code is provided from the sequencer cache.

Other aspects of the invention will become more apparent from the following detailed description, taken in conjunction with the accompanying drawings, illustrating by way of example the present invention.

DETAILED DESCRIPTION

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
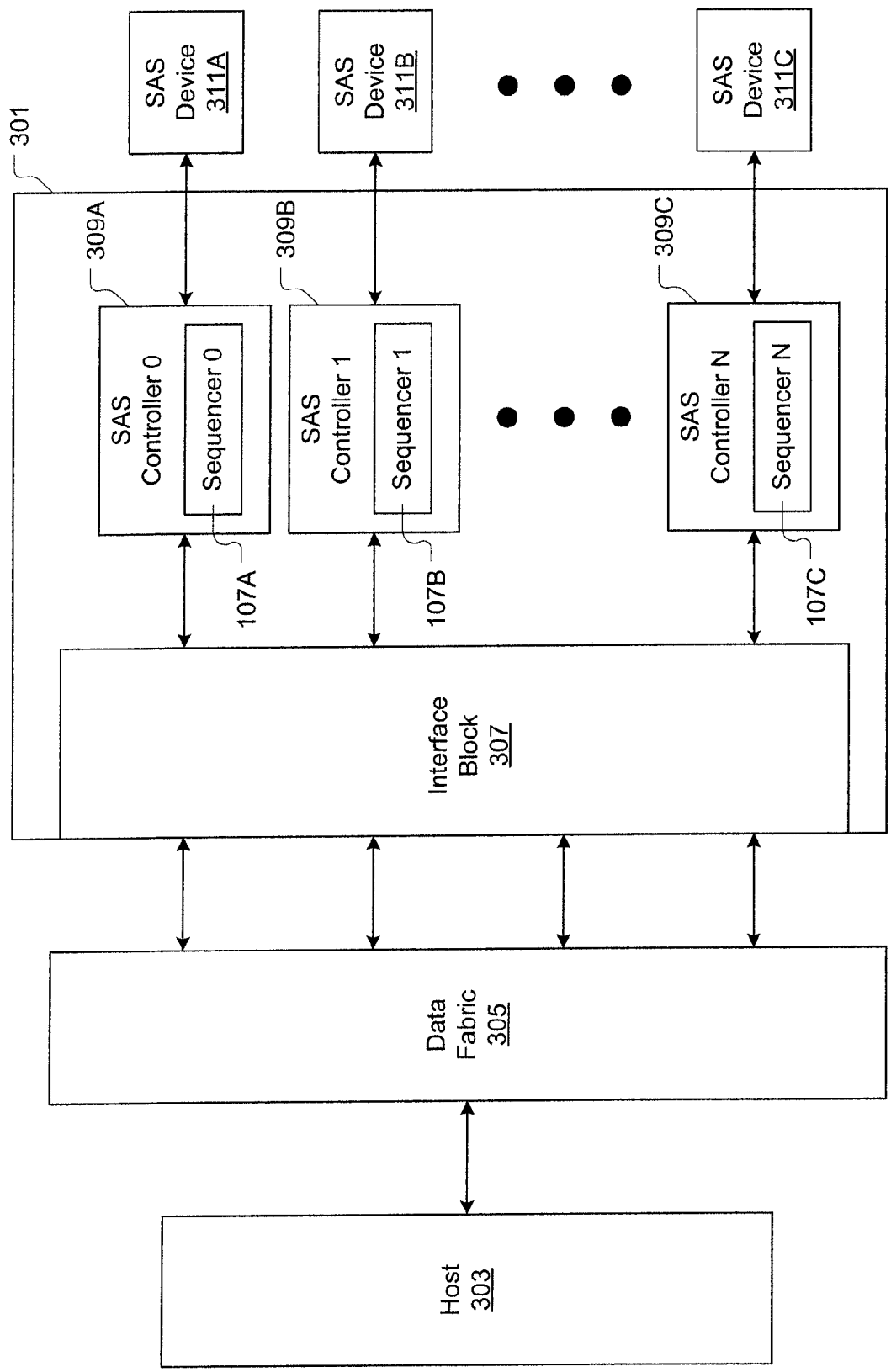
FIG. 1 is an illustration showing an exemplary portion of a Serial Attached SCSI (SAS) communication architecture, in accordance with one embodiment of the present invention.

FIG. 1 is an illustration showing an exemplary portion of a Serial Attached SCSI (SAS) communication architecture, in accordance with one embodiment of the present invention. The architecture includes a SAS interface engine 301, a data fabric 305, and a host block 303. The SAS interface engine 301 includes a number of SAS controllers 309A-309C. In one embodiment, each of the SAS controllers 309A-309C is connected to control a peripheral device, e.g., disk drive, 311A-311C, respectively. It should be appreciated that the SAS interface engine 301 can include any number of SAS controllers 309A-309C. In one embodiment, the SAS interface engine 301 includes eight SAS controllers 309A-309C. Also, in one embodiment, each SAS controller 309A-309C includes two read DMA (direct memory access) engines and one write DMA engine. However, it should be appreciated that in other embodiments the SAS controllers 309A-309C can be configured to have a different number of read and write DMA engines.

In each of the SAS controllers 309A-309C, the read DMA engines are respectively connected to read ports, and the write DMA engine is connected to a write port. Each read port of the SAS controllers 309A-309C is connected to a respective port of an interface block 307 within the SAS interface engine 301. The interface block 307 presents a generic DMA interface to the SAS controllers 309A-309C. The generic DMA interface presented by the interface block 307 is configured to have a number of master ports. The number of master ports associated with the interface block 307 can vary in different embodiments. Each master port of the interface block 307 is connected to a respective port of the data fabric 305. The master ports of the interface block 307 represent the interfaces from the data fabric 305 to the read DMA engines of the SAS controllers 309A-309C.

The data fabric 305 operates as a routing engine to route communications from targets on the host block 303 to the SAS interface engine 301. The number of targets on the host block 303 can vary in different embodiments. In one embodiment, the data fabric 305 is defined as a state machine that operates to connect the master ports of the interface block 307 to targets on the host block 303. During operation of the SAS communication architecture, each read DMA engine of the SAS controllers 309A-309C can act as a read requester. When the read DMA engine of the SAS controller 309A-309C issues a read request from its respective read port, the read request is transmitted to an available master of the interface block 307. From the interface block 307, the read request is transmitted through the data fabric 305 to the appropriate target at the host block 303. The read request is then processed at the host block 303. In one embodiment, the host block 303 is defined to communicate with an operating system of a computing platform.

Each of the SAS controllers 309A-309C is defined to include a respective sequencer 107A-107C. Each sequencer 107A-107C is effectively defined as a processor chip. The sequencers 107A-107C are defined to control the SAS interface engine 301. For example, each of the sequencers 107A-107C is defined to control the delivery of data to or from the device 311A-311C to which it is connected. Additionally, each of the sequencers 107A-107C can be defined to control exception handling and status reporting, among other tasks. The operation of each sequencer 107A-107C is conducted in accordance with a compiled sequencer operation code, i.e., sequencer code. The sequencer code represents a set of binary instructions defined to direct the operation of each sequencer 107A-107C in performing its assigned operations. It should be understood that each sequencer 107A-107C operates in accordance with the same sequencer code.

As the functionality of the sequencer 107A-107C is expanded, the amount of required sequencer code expands accordingly. For the sequencers 107A-107C to operate, the sequencer code needs to be accessible by the sequencers 107A-107C. Each sequencer 107A-107C includes a memory defined onboard the sequencer. This memory is used to store the sequencer code. As the functionality of the sequencer 107A-107C is expanded, more chip area may be required to implement the logic for the expanded functionality. Also, as the functionality of the sequencer 107A-107C is expanded, the amount of sequencer code expands, thus requiring the amount of memory required to store the sequencer code to expand. Because the sequencer 107A-107C and its associated memory is restricted to a limited amount of chip area, as the functionality of the sequencer 107A-107C is expanded, the chip area becomes a limiting factor.

To enable expansion of the sequencer 107A-107C functionality with consideration for the limited available chip area, it is necessary to minimize the expansion of the memory onboard the sequencer 107A-107C. Moreover, in one embodiment, expansion of the sequencer 107A-107C functionality with consideration for the limited available chip area, may necessitate a reduction in the memory onboard the sequencer 107A-107C. With the expanded sequencer 107A-107C functionality, the expanded sequencer code needs to be stored in a manner accessible to the sequencer 107A-107C. If the memory onboard the sequencer 107A-107C is not increased to accommodate the expanded sequencer code, a portion of the expanded sequencer code will need to be stored outside of the sequencer 107A-107C memory, but be readily available to the sequencer 107A-107C when needed.

Figure 2:
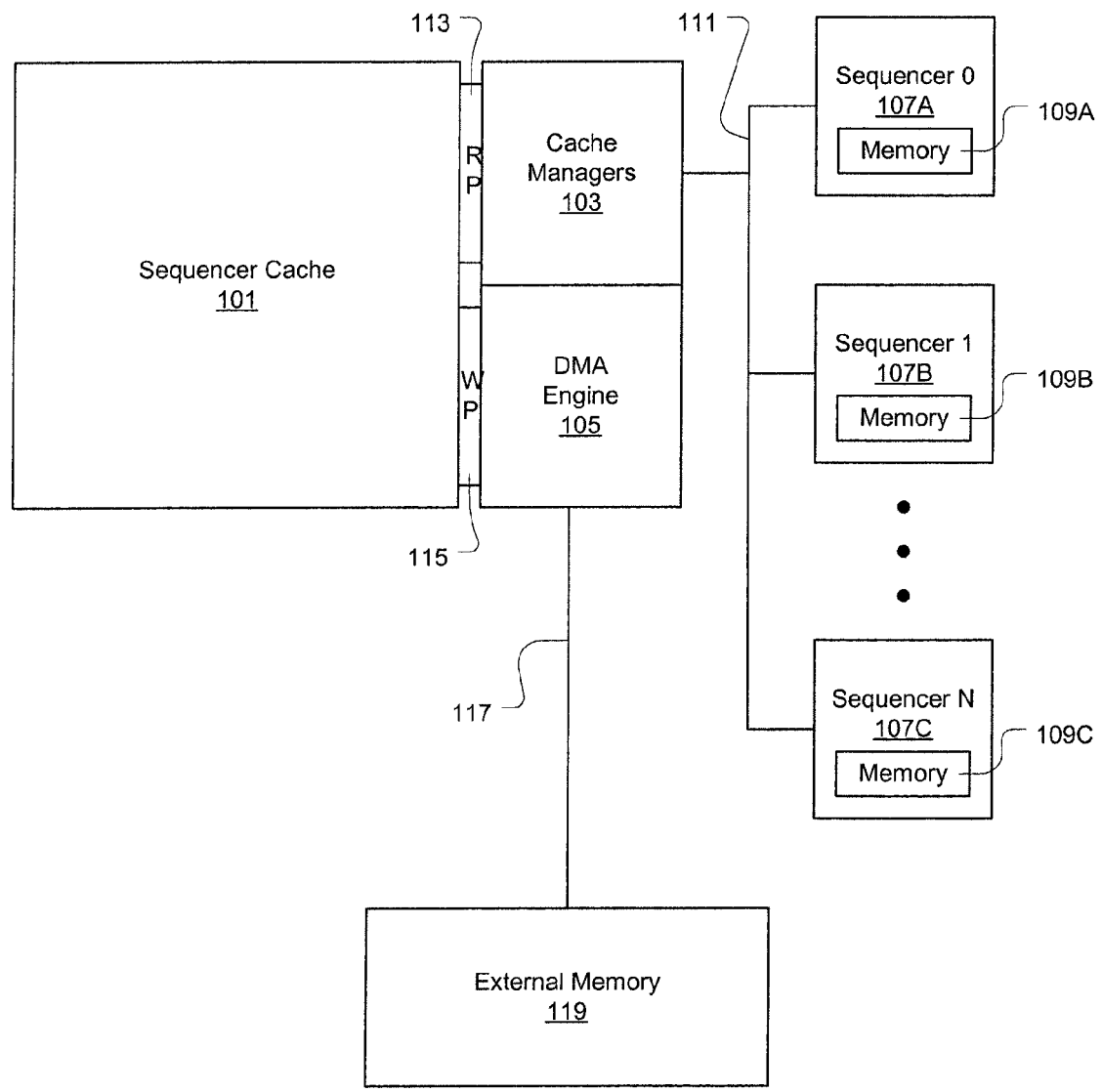
FIG. 2 is an illustration showing a sequencer cache, in accordance with one embodiment of the present invention.

FIG. 2 is an illustration showing a sequencer cache 101, in accordance with one embodiment of the present invention. The sequencer cache 101 provides a memory augmentation for each of the sequencers 107A-107C. Through the sequencer cache 101, a portion of the sequencer code that cannot be stored in a memory 109A-109C defined onboard the sequencer 107A-107C, can be stored outside of the sequencer 107A-107C and be readily available to the sequencer 107A-107C when needed. Thus, the sequencer cache 101 serves to provide sufficient memory for storing the sequencer code, while minimizing the chip area impact of the memory 109A-109C defined onboard the sequencer 107A-107C. In one embodiment, sequencer code that needs to be available for real-time core functions of the sequencer 107A-107C is stored in the memory 109A-109C defined onboard the sequencer 107A-107C. Also in this embodiment, sequencer code that does not have to be accessed quickly, e.g., exception handling code and the like, is stored outside of the memory 109A-109C defined onboard the sequencer 107A-107C, and is made available to the sequencer 107A-107C through the sequencer cache 101.

FIG. 2 shows each sequencer 107A-107C having its respective memory 109A-109C defined therein. As mentioned above, the memory 109A-109C defined onboard the sequencer 107A-107C is used to store sequencer code associated with sequencer operations that are to be performed in a real-time manner, i.e., quickly. For example, the sequencer code for controlling delivery of data to or from the device 311A-311C can be stored in the onboard memory 109A-109C. Also, for example, the sequencer code for controlling setup of DMA engines within the SAS controller 309A-309C can be stored in the onboard memory 109A-109C. The sequencer code for operations that are not time-sensitive, e.g., sequencer code for exception handling or status reporting, can be stored outside of the onboard memory 109A-109C and be made available to the sequencer 107A-107C through the sequencer cache 101.

Figure 3:
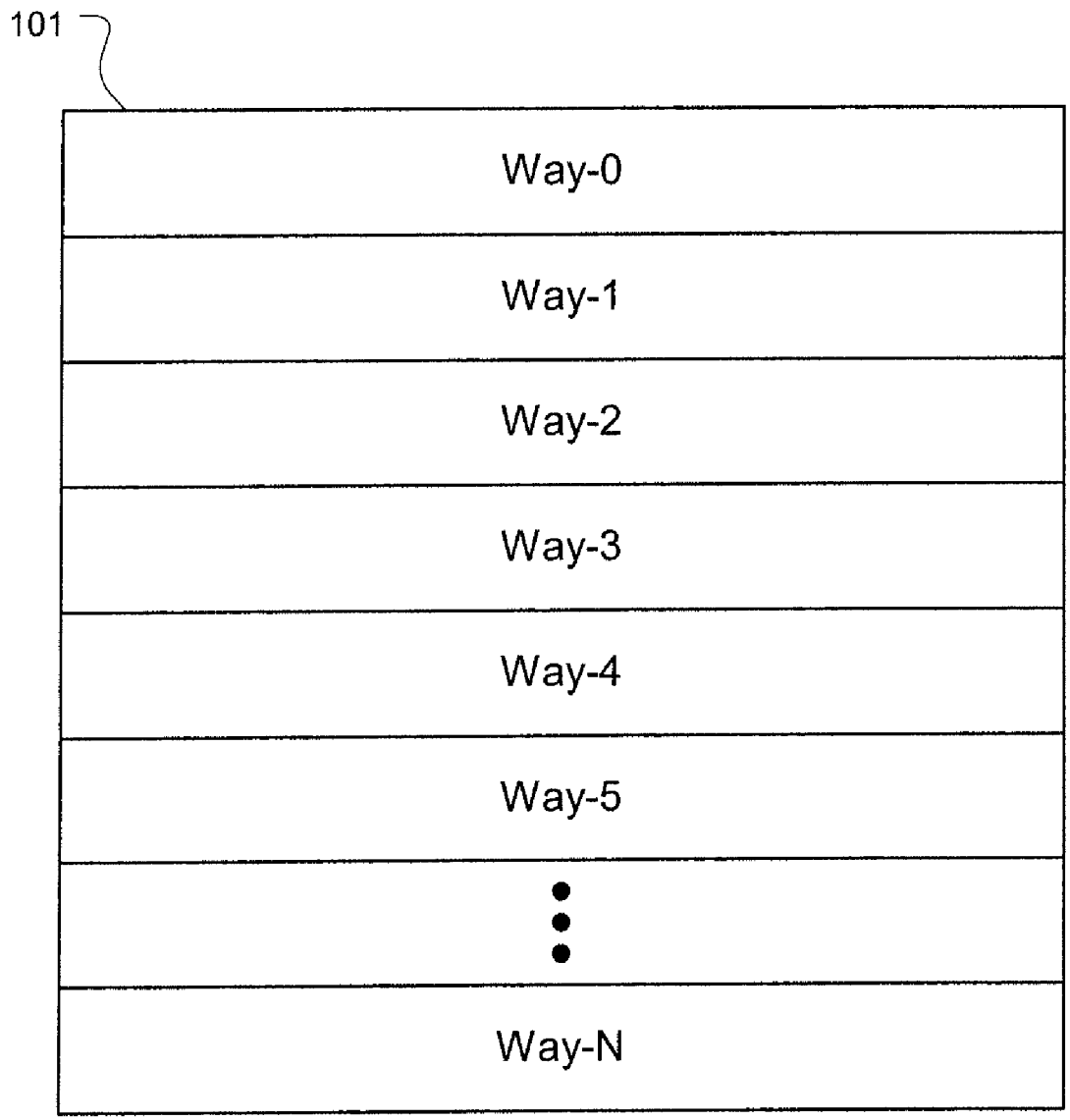
FIG. 3 is an illustration showing the sequencer cache split into a number of WAYs, in accordance with one embodiment of the present invention.

With regard to FIG. 2, the sequencer cache 101 includes a read port 113 and a write port 115. The read port 113 enables reading of data stored in the sequencer cache 101. The write port 115 enables writing of data to the sequencer cache 101. The sequencer cache 101 represents a common cache memory that is accessible by all sequencers 107A-107C. The sequencer cache 101 is defined to include a number of "WAYs." Those skilled in the art will appreciate that a WAY of a cache effectively represents a block of the cache. For example, in a one kilobyte cache split into four WAYs, each WAY represents a contiguous 256 byte section of the cache. Thus, each WAY is assigned to a range of the cache. FIG. 3 is an illustration showing the sequencer cache 101 split into a number of WAYs (WAY-0 through WAY-N), in accordance with one embodiment of the present invention. The sequencer cache 101 can be divided into any number of WAYs, as necessary to satisfy the sequencer code access requirements of the sequencers 107A-107C. The sequence cache 101 has a fixed total size. Therefore, a larger number a WAYs will result in a smaller size of each WAY, vice-versa.

Cache managers 103 are provided to service the sequencer code requests of the various sequencers 107A-107C. A separate cache manager 103 is provided for each sequencer 107A-107C, and is defined to service the sequencer code requests received from its particular sequencer 107A-107C. For example, if there are eight sequencers 107A-107C, there will be eight respective cache managers 103. For ease of illustration, the sequencers 107A-107C are shown as being connected through a communication bus 111 to the cache managers 103. Each cache manager 103 is capable of viewing the content of each WAY within the sequencer cache 101. More specifically, each cache manager 103 is capable of viewing the particular sequencer code memory range stored in each WAY of the sequencer cache 101. Also, through the read port 113, each cache manager 103 is capable of reading sequencer code from any of the WAYs within the sequencer cache 101. Therefore, each cache manager 103 is capable of providing sequencer code from any of the WAYs within the sequencer cache 101 to its respective sequencer 107A-107C.

A direct memory access (DMA) engine 105 is also provided to facilitate writing of sequencer code to the sequencer cache 101 from an external memory 119. The entire sequencer code is stored in the external memory 119. In various embodiments, the external memory 119 can be defined a random access memory (RAM), a hard drive, a flash memory, etc. It should be appreciated that the external memory 119 can be defined as essentially any type of logic structure capable of storing binary data. The DMA engine 105 is programmed with the location in the external memory 119 of a contiguous memory range where the full sequencer code is stored. It should be understood that the full sequencer code includes both the sequencer code stored in the memory 109A-109C onboard the sequencer 107A-107C, and the portion of the sequencer code not stored in the memory 109A-109C onboard the sequencer 107A-107C.

When a sequencer 107A-107C requests sequencer code through a cache manager 103, the cache manager 103 will determine if the requested sequencer code is present in the sequencer cache 101. If the requested sequencer code is present in a WAY of the sequencer cache 101, a cache hit occurs, and the cache manager 103 reads the requested sequencer code through the read port 113 and transmits the requested sequencer code to the sequencer 107A-107C. If the requested sequencer code is not present in a WAY of the sequencer cache 101, a cache miss occurs, and the cache manager 103 directs the DMA engine 105 to fetch the appropriate sequencer code from the external memory 119. The DMA engine 105 is defined to read the requested sequencer code from the external memory 119, and write the requested sequencer code into one of the WAYs of the sequencer cache 101, via the write port 115. Because an entire WAY is filled with data, i.e., sequencer code, in a given write operation, each time the DMA engine 105 fetches requested sequencer code, the DMA engine 105 reads an appropriate amount of data from the external memory 119 so as to fill the entire WAY in the sequencer cache 101.

As previously discussed, a larger number of WAYs in the cache corresponds to a smaller block size for each WAY. With smaller sized WAYs, the DMA engine 105 fetching operation can be performed faster because less data needs to be read from the external memory 119 and written to the sequencer cache 101. Smaller sized WAYs may be beneficial when the sequencer 107A-107C operations jump around in the sequencer code, i.e., when a large number of sequencer code instructions are not executed sequentially. In this case, the smaller sized WAYs are beneficial because time is not wasted operating the DMA engine 105 to read and write sequencer code into the WAY that is not needed by the sequencer 107A-107C.

On the other hand, with smaller sized WAYs, if the sequencer 107A-107C is executing a large number of sequencer code instructions in a sequential manner, the sequencer code stored in a given WAY will be read through quickly causing an increased number of cache misses. With the increased number of cache misses, the number of DMA engine 105 fetching operations will increase. Therefore, setting of the number of WAYs in the sequencer cache 101, and hence the size of each WAY, is a balance between optimizing sequencer code availability, i.e., increasing cache hits, while minimizing DMA engine 105 operation, i.e., decreasing cache misses.

To facilitate description of the sequencer cache 101 operation, consider that the sequencer 107A is functioning to perform its assigned tasks. The memory 109A includes a portion of sequencer code required to perform primary sequencer operations that are required to be performed in a substantially fast manner. The entire sequencer code, including the portion stored in the memory 109A, is stored in the external memory 119. During operation, the sequencer 107A may be directed to a sequencer code instruction that is not present in the memory 109A. When this occurs, the sequencer 107A sends an appropriate sequencer code request to the cache manager 103 dedicated to the sequencer 107A.

In response to the sequencer code request from the sequencer 107A, the cache manager 103 checks each WAY of the sequencer cache 101 to determine if the requested sequencer code is already present in the sequencer cache 101. If the requested sequencer code is present in the sequencer cache 101, a cache hit occurs. In response to the cache hit, the cache manager 103 transmits the requested sequencer code from the appropriate WAY in the sequencer cache 101 to the sequencer 107A.

If the requested sequencer code is not present in the sequencer cache 101, a cache miss occurs. In response to the cache miss, the cache manager 103 directs the DMA engine 105 to read the requested sequencer code from the external memory 119 and write the requested sequencer code to an appropriate WAY in the sequencer cache 101. As discussed above, the DMA engine 105 reads a contiguous chuck of data, i.e., sequencer code, from the external memory that is the same size as each WAY in the sequencer cache 101. In one embodiment, the contiguous chuck of sequencer code read from the external memory 119 by the DMA engine 105 starts at a memory location corresponding to the sequencer code instruction requested by the sequencer 107A.

When a cache miss occurs, the cache manager 103 determines a target WAY within the sequencer cache 101 into which the sequencer code is to be written by the DMA engine 105. The cache manager 103 communicates the target WAY to the DMA engine 105. If a WAY is identified as not yet having sequencer code written therein, such as at the start of sequencer operation, the cache manager 103 identifies the WAY as the target WAY. In one embodiment, the sequencer code data written to each WAY by the DMA engine 105 will not be "invalidated" once written. This feature is possible because the sequencer cache 101 is dedicated to only serve the sequencers 107A-107C with requested sequencer code. More specifically, once sequencer code is written to a WAY, the sequencer code within the WAY will not be modified until the entire WAY is overwritten with newly fetched sequencer code.

It should be appreciated that by simply comparing the number of cache misses since the beginning of sequencer operation to the number of WAYs, it is possible to know when all WAYs have been filled with sequencer code. Additionally, as sequencer code is fetched and written to successive WAYs from the start of sequencer operation up to filling all of the WAYs with sequencer code, the number of cache misses can be tracked to identify the next WAY in the sequencer cache 101 to which fetched sequencer code is to be written. Therefore, it is not necessary to explicitly track whether or not each WAY includes valid data. More specifically, the sequencer cache 101 does not require validity bits.

After a number of cache misses equal to the number of WAYs, each WAY will have sequencer code written thereto by the DMA engine 105. Therefore, upon subsequent cache misses, the cache manager 103 needs to determine which of the WAYs within the sequencer cache 101 will be overwritten by the sequencer code to be fetched by the DMA engine 105. The cache manager 103 implements a history algorithm to determine which of the WAYs is to be overwritten by the sequencer code fetched by the DMA engine 105. In one embodiment, the history algorithm tracks a duration since last access, i.e., read operation, for each WAY.

In one embodiment, a respective timer is defined for each WAY. For example, an eight bit timer is defined for each WAY, respectively. At start of sequencer operation, each timer is foxed out, i.e., each bit in the timer is set to one/high state. At each sequencer cycle thereafter, the timer for each WAY is decremented by one. In one embodiment, a sequencer cycle corresponds to three system clock cycles. In one embodiment, when a given WAY is read from in order to service a sequencer, the timer for that WAY is incremented by one. In another embodiment, when a given WAY is read from in order to service a sequencer, the timer for that WAY is foxed out. When the cache manager 103 needs to determine a WAY to be overwritten, the WAY having the timer with the lowest value will be overwritten by the newly fetched sequencer code.

Unlike conventional cache, the sequencer cache 101 does not require validity bits, history bits, or the like. Also, unlike conventional cache, the sequencer cache 101 does not have to worry about managing the cache content in view of multiple writes from multiple sources. Thus, the sequencer cache 101 is a simplified type of cache defined in a specialized manner for the purpose of servicing sequencers with sequencer code. It should be appreciated that a WAY of the sequencer cache 101 having been filled with sequencer code, will not be modified until the WAY is identified as a target WAY to be overwritten in its entirety by newly fetched sequencer code.

When a cache hit occurs, the requested sequencer code is provided from the sequencer cache 101 to the requesting sequencer without delay. Thus, when a cache hit occurs, the requested sequencer code is provided to the requesting sequencer in effectively the same manner as if the requested sequencer code had been present in the memory onboard the requesting sequencer. Therefore, it should be appreciated that the off-chip sequencer cache 101 enables the functionality of the sequencer to be expanded without having to increase the size of the memory onboard the sequencer in order to accommodate the corresponding sequencer code expansion.

Figure 4:
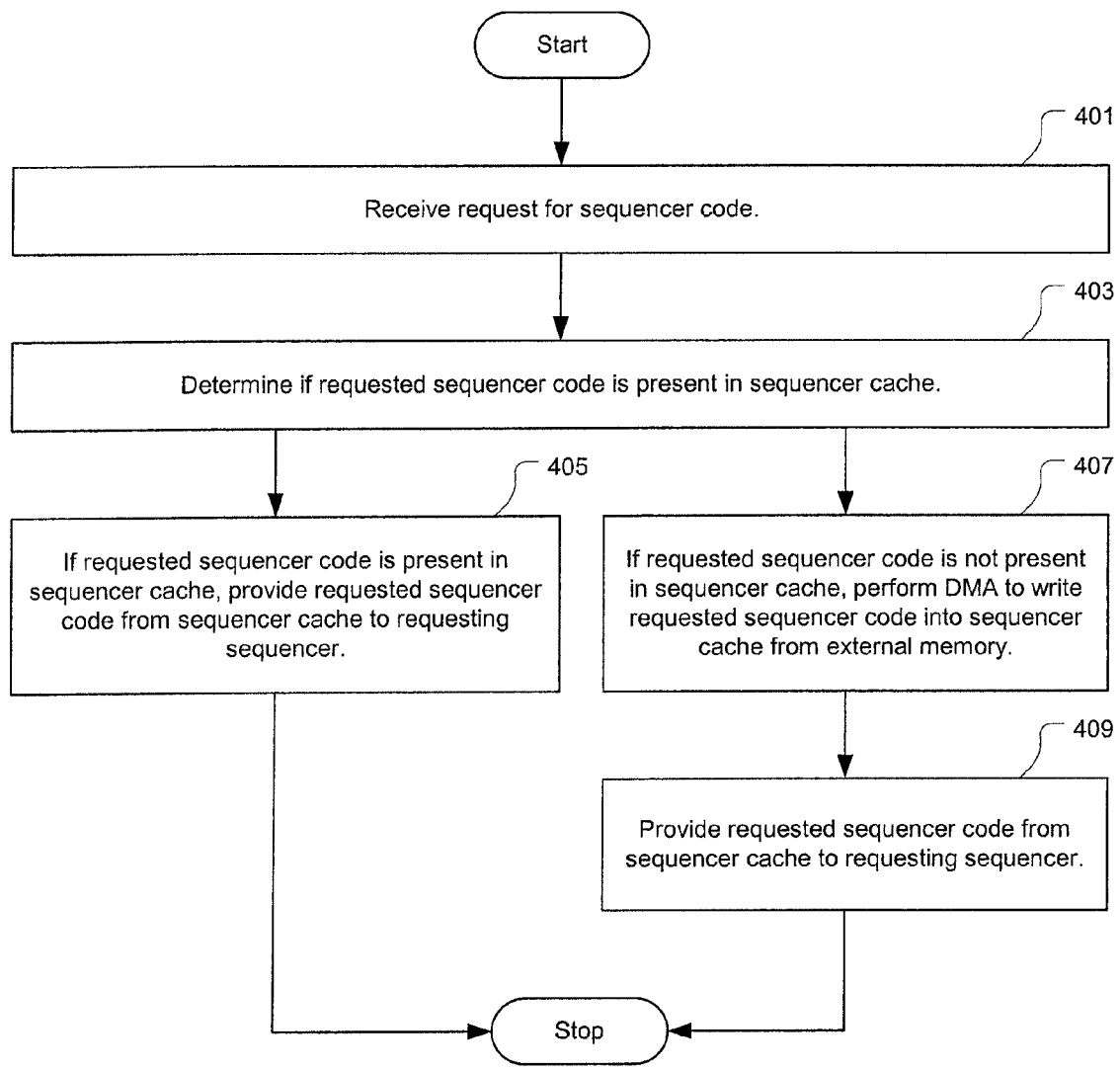
FIG. 4 is an illustration showing a flowchart of a method for operating a sequencer cache, in accordance with one embodiment of the present invention.

FIG. 4 is an illustration showing a flowchart of a method for operating a sequencer cache, in accordance with one embodiment of the present invention. It should be understood that the method of FIG. 4 is to be implemented using the sequencer cache configuration described above with respect to FIGS. 1-3. The method includes an operation 401 for receiving a request for sequencer code. The request for sequencer code can be transmitted from a sequencer upon identifying a required sequencer code instruction as not being present within a memory onboard the sequencer. The request for sequencer code specifies the required sequencer code instruction.

The method continues with an operation 403 for determining if the requested sequencer code is present in the sequencer cache. If the requested sequencer code is present in the sequencer cache, an operation 405 is performed to provide the requested sequencer code from the sequencer cache to the requesting sequencer. If the requested sequencer code is not present in the sequencer cache, the method includes an operation 407 for performing a DMA to write the requested sequencer code into the sequencer cache from an external memory. Once written into the sequencer cache, an operation 409 is performed to provide the requested sequencer code from the sequencer cache to the requesting sequencer. The sequencer code written into the sequencer cache from the external memory remains valid during its existence in the sequencer cache.

In one embodiment, a WAY of the sequencer cache is identified as having a longest duration since last access. In this embodiment, the DMA of operation 407 is performed to overwrite an entirety of the identified WAY with sequencer code from the external memory beginning with the requested sequencer code. Also, to facilitate this embodiment, a respective timer can be operated for each of a number of WAYs of the sequencer cache to respectively track the duration since last access of each WAY.

In the method of FIG. 4, the sequencer cache is operated to only receive requests for sequencer code. Also, the requests for sequencer code originate only from sequencers connected to the sequencer cache. Additionally, the sequencer cache operated in accordance with the method of FIG. 4 is operated without managing history bits or validity bits.

One skilled in the art will appreciate that the present invention can be defined on a semiconductor chip using logic gates configured to provide the functionality of the method as previously discussed. For example, a hardware description language (HDL) can be employed to synthesize hardware and a layout of the logic gates for providing the necessary functionality described herein.

Furthermore, with the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. It is therefore intended that the present invention includes all such alterations, additions, permutations, and equivalents as fall within the true spirit and scope of the invention.

What is claimed is:

1. A cache system, comprising:
a common cache memory dedicated to only service a plurality of sequencers with sequencer code during normal operation of the plurality of sequencers, wherein each of the plurality of sequencers is disposed within a Serial Attached SCSI (SAS) controller and is defined as a processor chip for controlling delivery of data to and from a peripheral device to which the processor chip is connected, and wherein the sequencer code is a set of binary instructions defined to direct operation of each of the plurality of sequencers, wherein each of the plurality of sequencers includes its own on-board cache memory;
an external memory defined to store a complete version of the sequencer code;
a plurality of cache managers respectively assigned to service a different one of the plurality of sequencers during normal operation of the plurality of sequencers, each of the plurality of cache managers defined to direct placement of sequencer code portions from the external memory into the common cache memory, each of the plurality of cache managers defined to provide requested sequencer code portions from the common cache memory to the on-board cache memory of its respectively assigned sequencer when a request for the sequencer code portions is provided to the cache manager from its respectively assigned sequencer during normal operation of its respectively assigned sequencer; and
a direct memory access (DMA) engine defined to write requested sequencer code portions from the external memory to the common cache memory in accordance with direction from any of the plurality of cache managers when the requested sequencer code portions are not already present in the common cache memory.

2. A cache system as recited in claim 1, wherein the common cache memory is defined to maintain sequencer code written thereto in a valid state during an entire existence of the sequencer code within the common cache memory.

3. A cache system as recited in claim 1, wherein the common cache memory is defined to be segmented into a number of WAYs, each of the cache managers defined to direct placement of sequencer code from the external memory into any of the number of WAYs of the common cache memory so as to completely fill the WAY with sequencer code.

4. A cache system as recited in claim 3, wherein the number of WAYs within the common cache memory is defined to increase a number of cache hits and decrease a number of DMA operations.

5. A cache system as recited in claim 3, wherein each of the number of cache managers is defined to view a content of each WAY within the common cache memory, each of the number of cache managers further defined to provide the content of any given WAY from the common cache memory to the on-board cache memory of its respectively assigned sequencer.

6. A cache system as recited in claim 3, further comprising:
a number of timers respectively associated with the number of WAYs, each of the number of timers defined to track a duration since a last access of the WAY to which the timer is associated.

7. A cache system as recited in claim 6, wherein each of the cache managers is defined to reference the number of timers to determine a particular WAY having a longest duration since the last access thereto, each of the cache managers further defined to direct the DMA engine to overwrite the particular WAY having the longest duration since the last access thereto when sequencer code in the external memory is placed in the common cache memory.

8. A communication architecture, comprising:
a plurality of sequencer processors disposed within a Serial Attached SCSI (SAS) controller, each of the plurality of sequencer processors defined to control delivery of data to and from a respective peripheral device to which the sequencer processor is connected;
a plurality of memory respectively defined onboard each of the plurality of sequencer processors; and
a sequencer cache system defined separate from the plurality of sequencer processors, the sequencer cache system defined to supply sequencer code not present in a given memory defined onboard a given sequencer processor to the given memory defined onboard the given sequencer processor during normal operation of the given sequencer processor, wherein the sequencer code is a set of binary instructions defined to direct normal operation of each of the plurality of sequencer processors,
wherein the sequencer cache system includes,
a common cache memory dedicated to service the plurality of sequencers with sequencer code;
an external memory defined to store a complete version of the sequencer code;
a plurality of cache managers respectively assigned to service a different one of the plurality of sequencers during normal operation of the plurality of sequencers, each of the plurality of cache managers defined to direct placement of sequencer code portions from the external memory into the common cache memory.

9. A communication architecture as recited in claim 8, wherein the sequencer cache system is defined in a manner so as to be dedicated to supply sequencer code to each of the plurality of sequencer processors connected to the sequencer cache system.

10. A communication architecture as recited in claim 8, wherein
each of the plurality of cache managers is defined to provide requested sequencer code portions from the common cache memory to the onboard memory of its respectively assigned sequencer when a request for the sequencer code portions is provided to the cache manager from its respectively assigned sequencer during normal operation of its respectively assigned sequencer, and
wherein the sequencer cache system includes a direct memory access (DMA) engine defined to write requested sequencer code portions from the external memory to the common cache memory in accordance with direction from any of the plurality of cache managers when the requested sequencer code portions are not already present in the common cache memory.

11. A communication architecture as recited in claim 8, wherein the common cache memory is defined to be segmented into a number of WAYs, each of the cache managers defined to direct placement of sequencer code into any of the number of WAYs so as to completely fill the WAY with sequencer code, each of the cache managers defined to view a content of each WAY within the common cache memory, and each of the cache managers defined to provide the content of any given WAY to its respectively assigned sequencer.

12. A method for operating a sequencer cache system, comprising:
- storing a complete version of a sequencer code in an external memory, wherein the sequencer code is a set of binary instructions defined to direct operation of each of a plurality of sequencer processors disposed within a Serial Attached SCSI (SAS) controller;
- receiving a request for sequencer code from a given sequencer processor of the plurality of sequencer processors during normal operation of the given sequencer processor, wherein each of the plurality of sequencer processors is defined to control delivery of data to and from a peripheral device to which it is connected, and wherein each of the plurality of sequencer processors includes its own on-board cache memory;
- upon receipt of the request for sequencer code, determining if the requested sequencer code is present in a common sequencer cache;
- upon determining that the requested sequencer code is present in the common sequencer cache, providing the requested sequencer code from the common sequencer cache to the on-board cache memory of the given sequencer processor; and
- upon determining that the requested sequencer code is not present in the common sequencer cache, performing a direct memory access (DMA) to write the requested sequencer code into the common sequencer cache from the external memory, and providing the requested sequencer code from the common sequencer cache to the on-board cache memory of the given sequencer processor.

13. A method for operating a sequencer cache system as recited in claim 12, further comprising:
- identifying a WAY of the common sequencer cache having a longest duration since last access, wherein the DMA overwrites an entirety of the identified WAY with sequencer code from the external memory beginning with the requested sequencer code.

14. A method for operating a sequencer cache system as recited in claim 13, further comprising:
- operating a respective timer for each of a number of WAYs of the common sequencer cache to respectively track the duration since last access of each WAY.

15. A method for operating a sequencer cache system as recited in claim 12, wherein the common sequencer cache is operated to only receive requests for sequencer code, the requests for sequencer code originating from any of the plurality of sequencer processors connected to the common sequencer cache.

16. A method for operating a sequencer cache system as recited in claim 12, wherein the requested sequencer code written into the common sequencer cache from the external memory remains valid during its existence in the common sequencer cache.

17. A method for operating a sequencer cache system as recited in claim 12, further comprising:
- identifying a required sequencer code instruction as not being present within the on-board cache memory of the given sequencer processor; and
- transmitting the request for sequencer code from the given sequencer processor to the common sequencer cache, wherein the request for sequencer code specifies the required sequencer code instruction.

* * * * *